Figure 10:
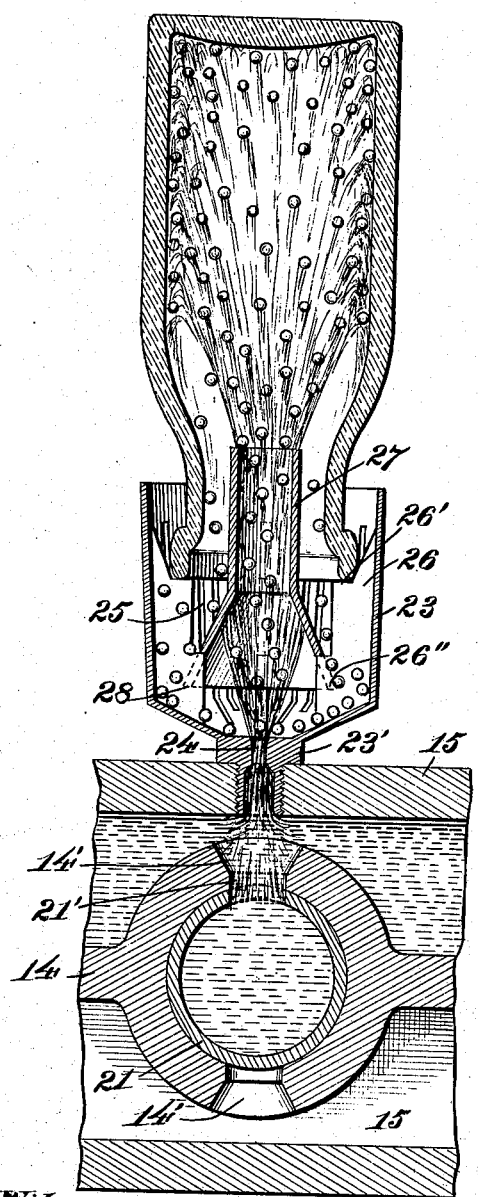

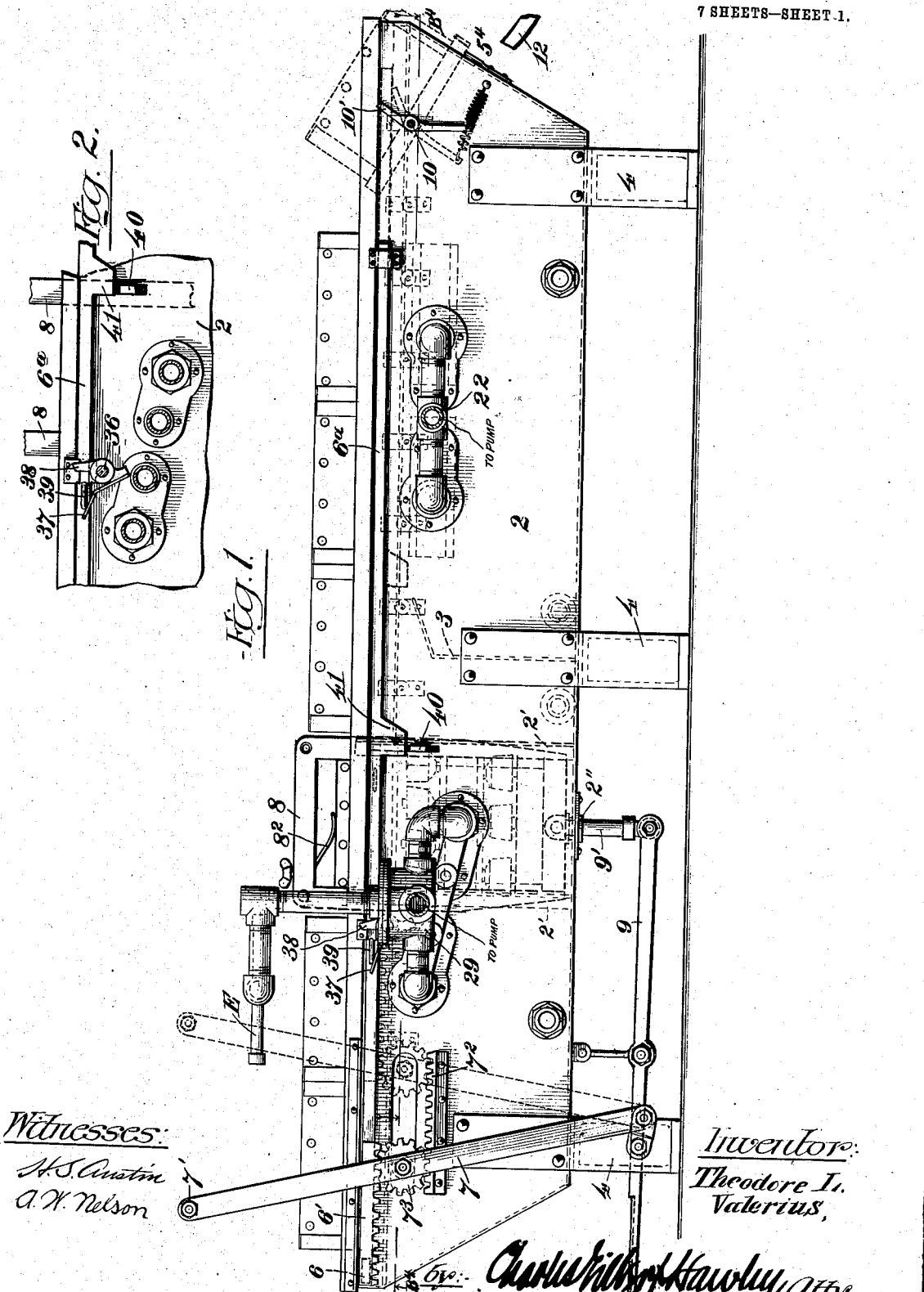

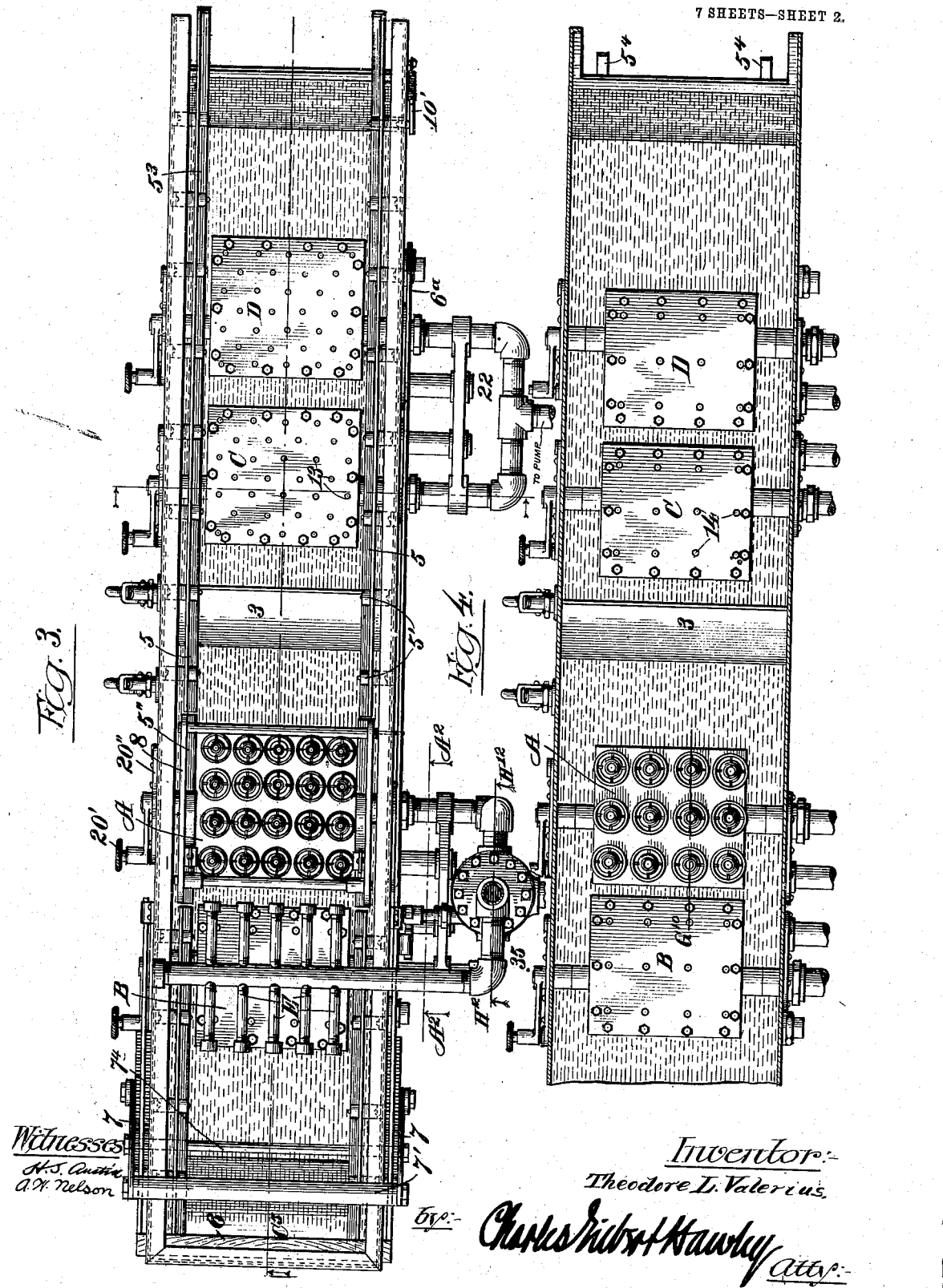

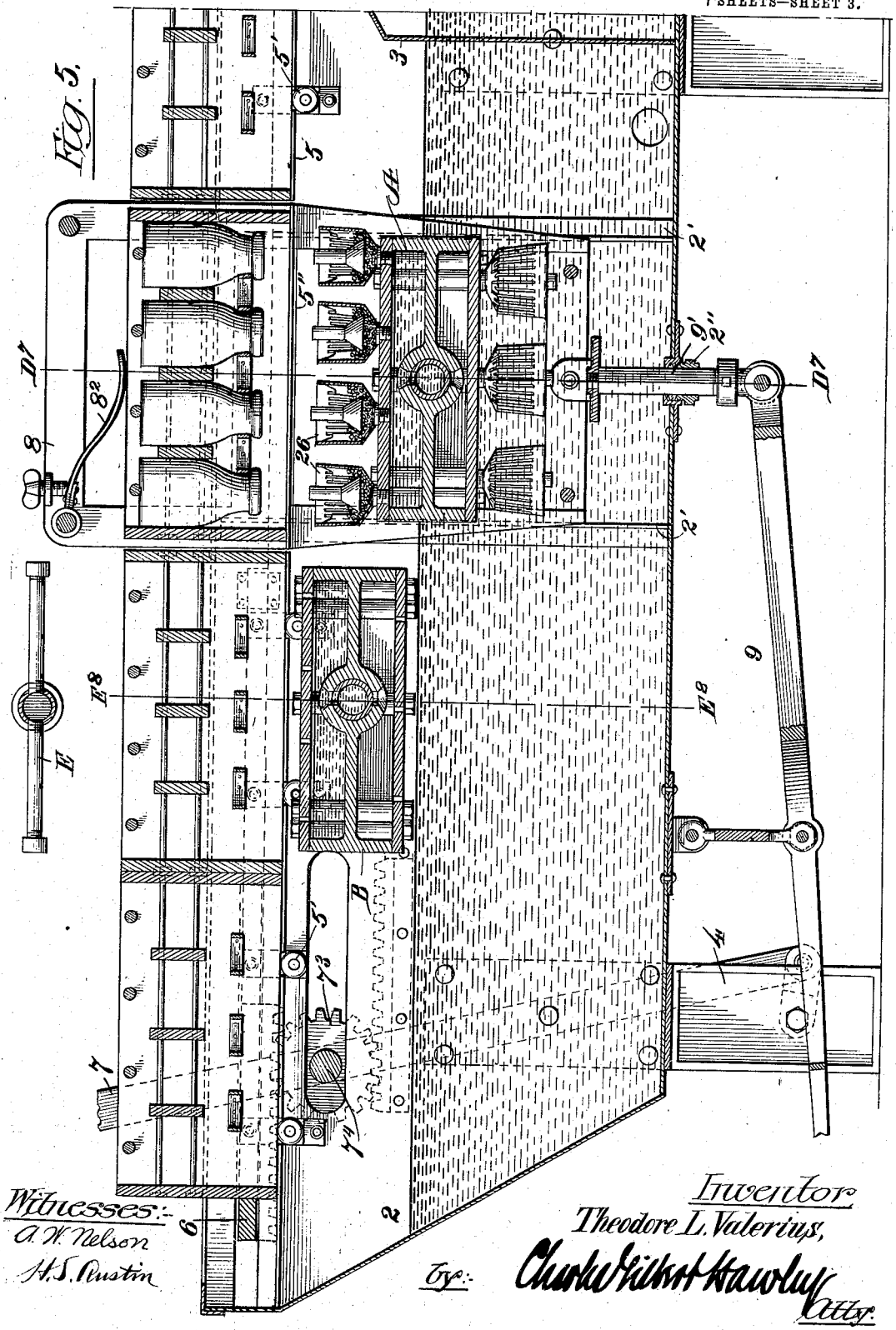

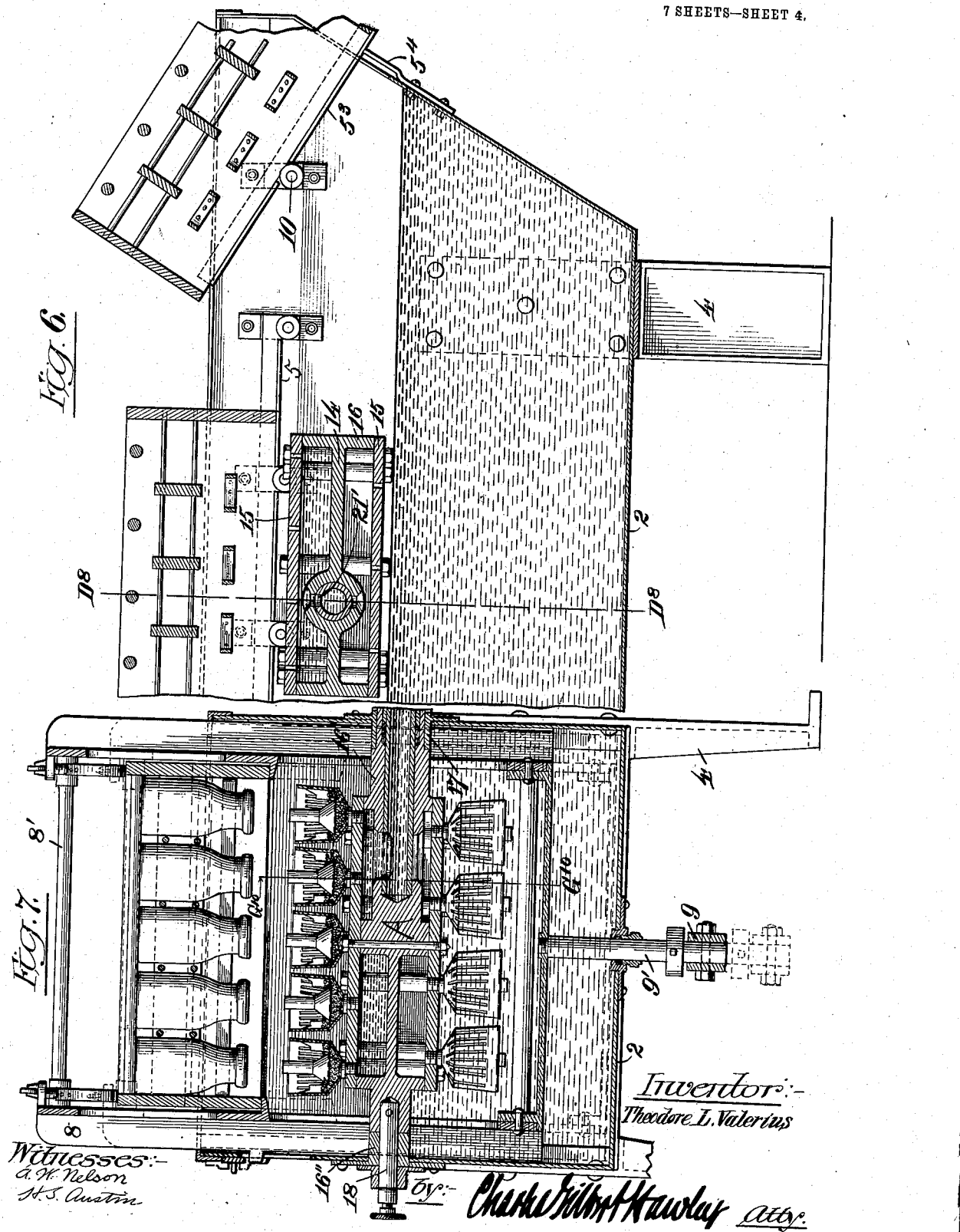

T. L. VALERIUS.
CASED BOTTLE WASHING MACHINE.
APPLICATION FILED JULY 28, 1906.
899,927.
Patented Sept. 29, 1908.
7 SHEETS—SHEET 5.
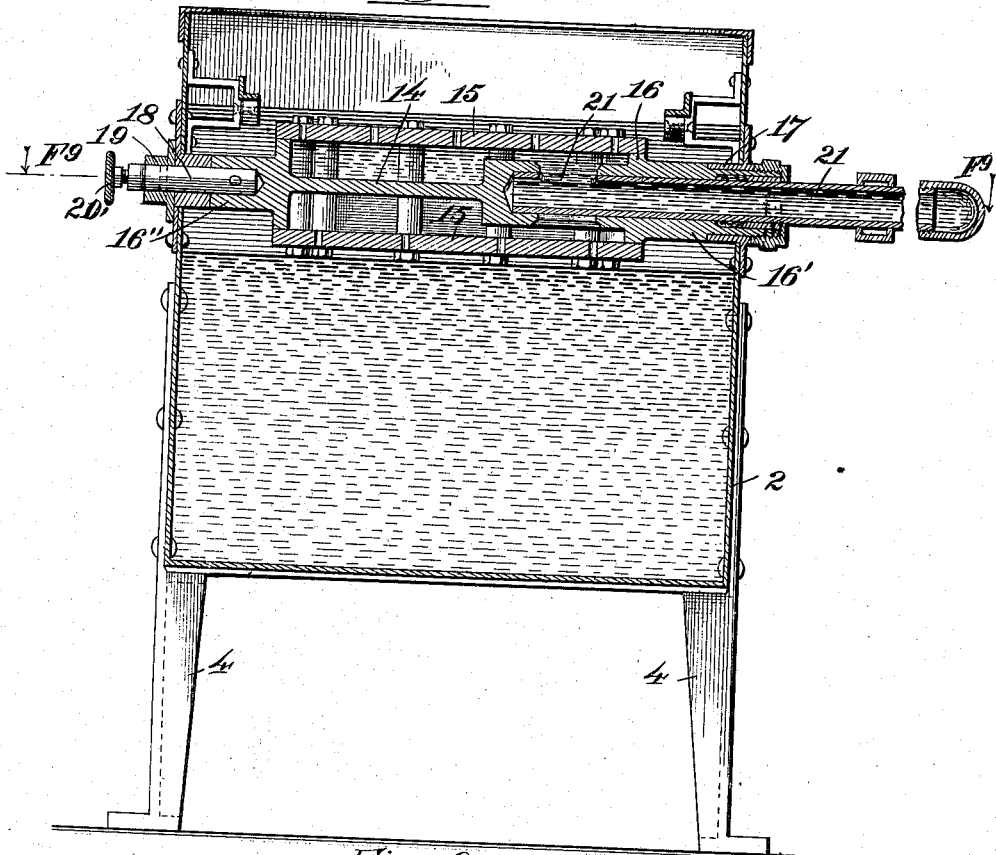
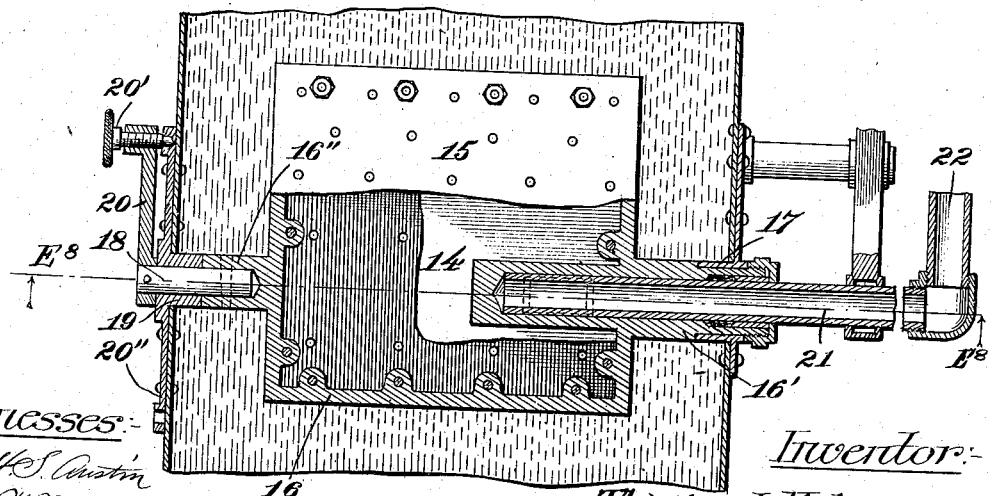
Witnesses:—
Inventor:—
Theodore L. Valerius

T. L. VALERIUS.
CASED BOTTLE WASHING MACHINE.
APPLICATION FILED JULY 28, 1906.

899,927.

Patented Sept. 29, 1908.
7 SHEETS—SHEET 6.

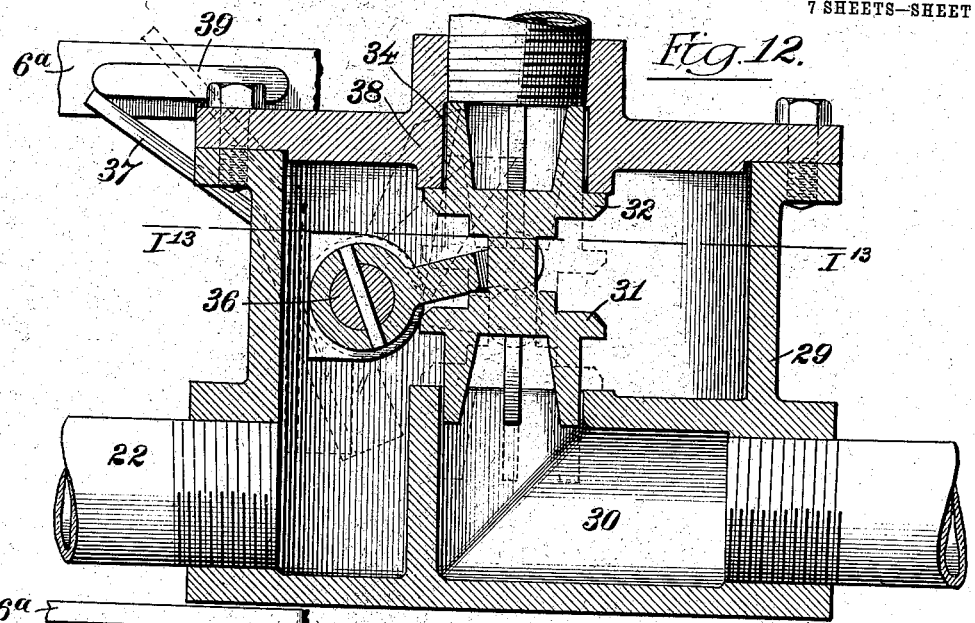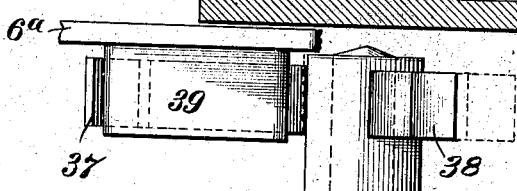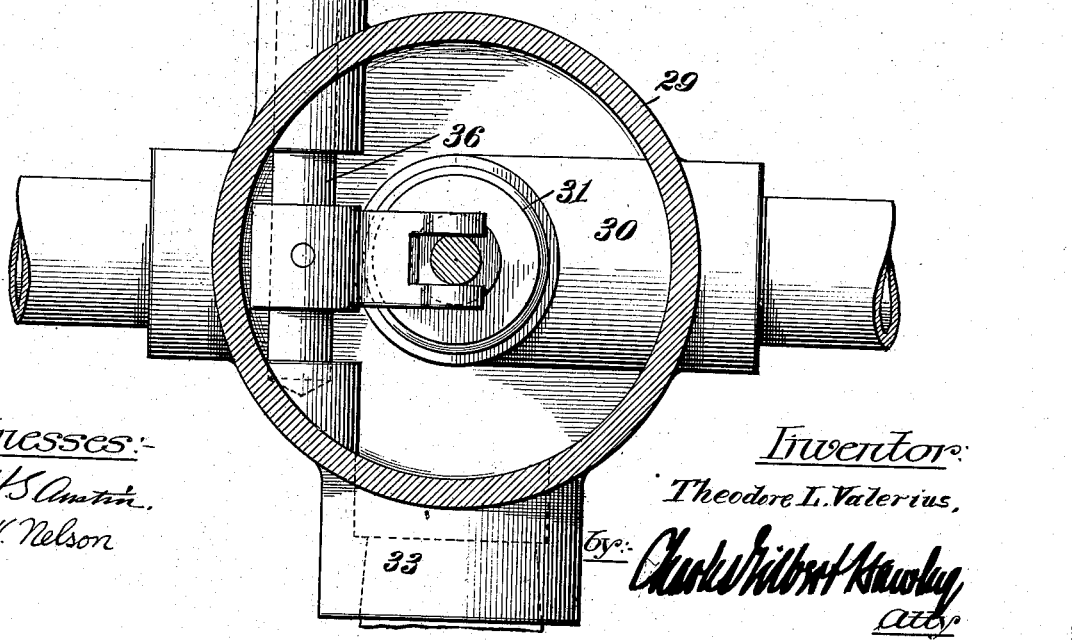

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

CASED-BOTTLE-WASHING MACHINE.

No. 899,927.      Specification of Letters Patent.      Patented Sept. 29, 1908.

Application filed July 28, 1906. Serial No. 328,227.

*To all whom it may concern:*

Be it known that I, THEODORE L. VALERIUS, of Fort Atkinson, in the county of Jefferson and State of Wisconsin, have invented a certain new, useful, and Improved Cased-Bottle-Washing Machine, of which the following is a full, clear, and exact description, such as will enable others skilled in the art to which it appertains to make and use the same.

My invention relates to improvements in bottle washing machines wherein jets of liquid are employed for cleansing the bottles, and my invention has particular reference to improvements upon machines of that class wherein the bottles or the like are inverted and are washed by jets of fluid directed thereinto from points beneath the bottles, the draining of the bottles being automatic and the operation as a whole being conducted in an automatic or semi-automatic manner.

The object of my invention is to provide a bottle washing machine of large capacity, adapted to meet the requirements of large bottling establishments.

A further object of my invention is to provide a bottle washing machine, which shall be capable of washing bottles previously arranged in groups, i. e., in bottle cases or boxes.

A further object of my invention is to provide a convertible bottle washing machine, in other words a machine readily adaptable to the washing of grouped or cased bottles of different sizes.

A further object of the invention is to provide a washing machine of such construction and arrangement of parts, that it may be successfully operated by a single person.

A further object is to provide a bottle washing machine which shall be of simple construction not apt to become disordered and easily repaired in case of need.

Still further objects of the invention will appear hereinafter.

My invention consists generally in a bottle washing machine which comprises a tank or trough to contain the washing fluid and the rinsing water, in combination with a track or way upon which inverted bottle cases may be moved from end to end of the trough, a plurality of jet heads arranged beneath said track or way, means for forcing liquid through the same and means for controlling the flow of said liquid.

Further and particularly my invention consists in a machine of the class described, equipped with a plurality of jet heads, whereof some operate continuously and others intermittently.

My invention also consists in a bottle washing machine characterized above, in which means are provided for intermittently moving the bottle cases or boxes and at the same time controlling the flow of liquid from certain of the jet heads. And further my invention consists in jet heads or members of novel form, and which are reversible for the purpose of adapting the machine to the washing of bottles of different sizes. And further my invention consists in a bottle washing machine comprising a track or support to receive a plurality of bottle cases in inverted position, in combination with a jet head arranged beneath said track a plurality of nozzles of special design, thereon, and means for relatively moving said jet head and the bottle case or box above the same, to engage the necks of the bottles with said nozzles, there being also means for supplying liquid to said nozzles when they are in engagement with the bottles. And further my invention consists in a bottle washing machine comprising a track or support, and means for moving bottle cases thereon, in combination with an elevator interposed in said track, a plurality of jet heads situated at different points in each said track, the jet head beneath or associated with said elevator having special nozzles to be engaged with the bottles by movement of said elevator, and a liquid valve operable in time with said elevator and adapted to prevent the discharge of liquid through said special nozzles while the bottle cases are being moved, or shifted upon said track. And further my invention consists in a bottle washing machine comprising a track or support, and means for moving bottle cases thereon, in combination with means beneath said track for directing jets of water into the bottles held in said cases and means at the end of said track for discharging the bottle cases after the bottles are washed. And further my invention consists in a washing machine as next above characterized and which is provided with a mechanism for not only discharging the cases, but also righting the same to prepare the bottles to be filled. And further my invention consists in various details of construction, and in combination of parts all as hereinafter described and particularly pointed out in the claims.

Figure 11:
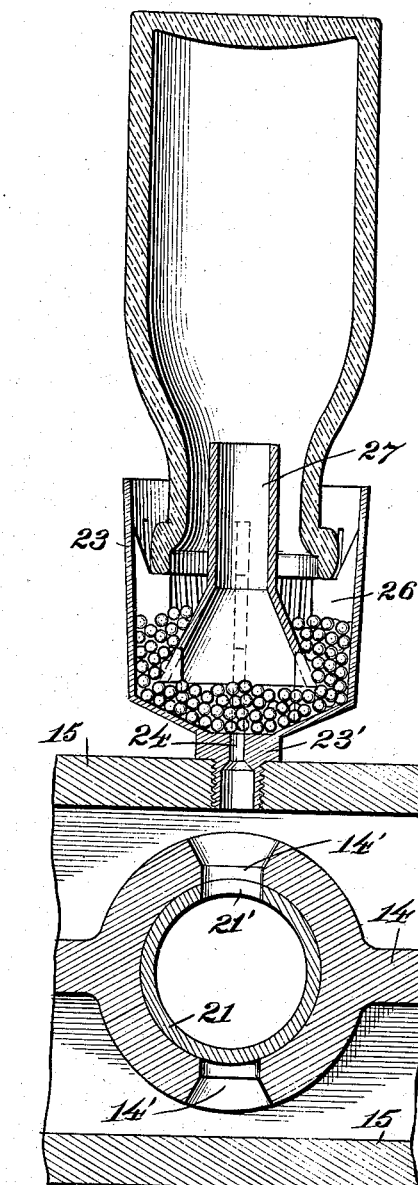

My invention will be more readily understood by reference to the accompanying drawings, forming a part of this specification, and in which;

Figure 1, is a side elevation of the bottle washing machine embodying my invention; Fig. 2, is a detailed side elevation of the valve-operating mechanism seen in Fig. 1, the view being taken upon the line $A^2$—$A^2$ of Fig. 3; Fig. 3, is a plan view of my machine; Fig. 4, is a similar plan view the upper portions being broken away on the line $B^4$—$B^4$ of Fig. 1, and the jet heads being relatively inverted; Fig. 5, is an enlarged vertical section of a portion of the machine on the line $C^5$—$C^5$ of Fig. 3; Fig. 6, is a similar view of the opposite end of the machine, also on the line $C^5$—$C^5$ of Fig. 3; Fig. 7, is a vertical section on the line $D^7$—$D^7$ of Fig. 5; Fig. 8, is a similar vertical section on the line $E^8$—$E^8$ of Figs. 5, 6 and 9. Fig. 9, is a horizontal section on the line $F^9$—$F^9$ of Fig. 8; Figs. 10 and 11, are sectional details substantially on the line $G^{10}$—$G^{10}$ of Figs. 4 and 7, the same illustrating the construction and operation of the nozzles which I employ on one of the jet heads; Fig. 12, is an enlarged vertical section of the washing fluid supply valve shown in Figs. 1 and 3, said section being on the line $H^{12}$—$H^{12}$ of Fig. 3; and Fig. 13, is a horizontal section of said valve on the line $I^{13}$—$I^{13}$ of Fig. 12.

As shown in the drawings, 2, represents a tank or trough. This is of sufficient length to accommodate quite a number of bottle cases or boxes, in inverted position, the washing of the bottles being accomplished during the transit of the containing boxes. The tank is divided into two parts by partition, 3, and when in use the compartment at the forward or receiving end of the machine is partly filled with washing fluid, and the rear compartment is filled with clear water for rinsing the bottles. The tank is supported by a suitable frame work or legs, 4. On the upper side walls of the tank are two rails which constitute a track or way upon which the boxes rest and whereon they are moved. These contain a plurality of rollers, 5', which serve to reduce the friction between the rails and the boxes. For moving the boxes on said track I preferably employ a push bar, 6. This is arranged in the forward end of the machine and is propelled against the end of the first bottle case and through the medium thereof forces all forward. For operating the push bar, I employ a two part lever or yoke, 7, the lower ends of which are pivotally linked to the forward leg of the machine while the upper ends are connected by a handle bar, 7', which the operator grasps and forces forward. The connection between the lever and the push bar is made through the medium of rack bars, $7^2$, 6' and spur pinions, $7^3$, the pinions being carried by the lever, 7, and the rack bars being secured upon the sides of the tank and upon the ends of the push bar, 6, respectively. The alinement of the pinions, $7^3$, is assured by fastening them on a cross shaft, $7^4$, which works in slots in the tank sides. By this arrangement of the racks and pinions the short stroke lever is enabled to produce the long forward movement of the push bar, necessary to shift the boxes forward one step. The ends of the slots in the tank limit the movement of the lever and make the movement exact. Certainty in said movement of the boxes is necessary for the reason that the same must be accurately positioned over the spraying or jet heads hereinafter described.

It will be noted from an inspection of Fig. 5, that considerable lost motion is allowed between the push bar, 6, and the end of the first box. The free motion thus permitted the push bar structure is utilized for operating the liquid valve of the machine as hereinafter specified.

It will be noted that the track rails are cut at intermediate points and that the sections, 5'', are independent of the remainder thereof. These sections, 5'', are parts of what I term the elevator portion of my machine. The elevator comprises the two side frames, 8—8, bearing the track sections, 5'' (see Figs. 3, 5 and 7) and connected by cross bars, 8', at top and bottom. The side frames are guided by upright rails, 2', on the sides of the tank and the frame is raised and lowered by means of a foot lever or treadle, 9, suspended from the bottom of the tank and connected with the frame by a rod or stem, 9', which extends through a stuffing box, 2'', in the bottom of the tank. When the front end of the treadle is depressed the elevator is raised and the track sections, 5'', are alined with the main rails, 5, to receive or discharge a box as indicated in Fig. 5. A spring or springs, $8^2$, at the top of the elevator press the box upon the rails, 5''. This provision for raising and lowering each box as it arrives at a certain point in the tank is made for the purpose of lowering the inverted bottles upon certain special bottle washing nozzles used at this point in the tank, as hereinafter described.

Referring to Figs. 1, 3, and 6, it will be noted that means are provided for discharging the boxes or cases from the rear end of the machine. The box supports or rails are again cut or interrupted at this point and the rail sections, $5^3$, being suitably connected are secured upon a rocking shaft, 10. The rear end of the tank is cut down to allow the frame to tilt as indicated, and $5^4$, is a stop on the end of the tank by which the tilt or angle of the frame, $5^3$, may be adjusted. The shaft, 10, extends through the side of the tank and is there provided with spring retracted arm or lever, 10'. This arm lies in the path of a rod, 6ᵃ, slidable in bearings on the tank and attached to the rack bar, 6'. When the push bar, 6, is driven forward to shift the row of boxes, the box at the rear end of the machine is pushed onto the tilting frame, 5³, and immediately thereafter the end of the rod, 6ᵃ, strikes the lever, 10', and thereby rocks or tilts the frame, 5³, to discharge the box. Beneath the level of the tilting frame is a box receiving incline or rack, 12, and the boxes are thrown or tilted from the end of the machine in such manner that they are turned upright upon said receiving rack, 12. Manual inversion of the boxes is thus dispensed with.

The positions or stations of the several boxes upon the tank are determined by the position of the elevator, 8. Directly beneath the elevator I arrange the main bottle washing device, and properly positioned in the other compartment of the tank is a main rinsing device. In constructing machines of limited capacity, I prefer to use a single washing device and a single rinsing device, but in machines of larger capacity, such as illustrated in the drawings, it is desirable to subject the bottles to initial washing before the washing operation proper is performed and it is also desirable to duplicate the rinsing device in the rear compartment, as represented in Fig. 3. Referring to the drawings for particulars, A, represents the main washing device;—B, the initial washing device;—and, C and D, the clear water rinsing devices. Hot washing fluid of a proper kind is used in the heads or member, A and B and clear hot water only, in the members, C and D. In arranging my machine for use, I equip it with two pumps, which are connected to the members A—B and the members, C—D, respectively. These pumps circulate the contents of respective compartments in the tank. Suitable means, not shown may be provided for heating said contents. Said means may be interposed between the tank and the pump or may comprise steam pipes arranged in the bottoms of the tank, to inject live steam into the liquid.

In addition to the members mentioned I employ a top or over-sprayer, E, comprising a plurality of perforated pipes extending across the top of the tank above the member, B. This is adapted to discharge the jets of washing fluid upon the bottoms and sides of the inverted bottles in the boxes standing between the members E and B, to clean both cases and the bottles.

The members or heads, A, B, C and D, are each provided with a plurality of jet openings in both top and bottom, the number of openings in the upper sides being the same throughout. A different number of openings is provided in the bottom or lower side of each head or member, but the number thereof is the same throughout the members. The machine herein illustrated is particularly adapted for washing milk bottles and the number of jet openings in the top of each member or jet head, A, B, C and D, and their positions therein correspond to the number and positions of a group of pint or half pints bottles, as held in one of the cases or boxes. In the other sides of the jet members the openings correspond in number and positions to the number and positions of a group of quart bottles as assembled in a quart bottle case.

Figs. 1, 3, 5 and 7, represent the machine as it appears when being employed in washing of pint or half pint milk bottles. It is usual to place twenty such bottles in each case or box, hence the pint bottle cleaning jets in the members, A, B, C and D are twenty in number. The perforated faces of the quart bottle sides of the heads or members, A, B, C and D, are represented in Fig. 4, twelve jet openings being arranged in each to correspond to the number of quart bottles in a quart bottle case or box. The heads may, without departure from the spirit of my invention be made separately and so used in the machine, that is, heads containing twelve openings each may be removed from the machine to make place for separate heads containing a larger number of jets, and vice versa. But I much prefer to employ the plural or double heads herein illustrated, each pair of heads being made in a single body and this body being arranged for rotation within the tank or trough, as required to present either of its sides or faces to the bottles.

The heads or members, A, B, C, or D, are substantially identical and a description of one will serve for all. Such member is rectangular or box like in form and contains two chambers separated by a partition, 14. For convenience the sides of the member comprise separate plates, 15, which are bolted to the main casting, 16, whereof 14, is an integral part. The ends of the body, 16, are provided with trunnions, 16', and 16''; the former supported in a bearing, 17, in the side of the tank, and the latter secured to a stud shaft, 18, held in a bearing, 19, on the opposite side of the tank. As stated the stud shaft is fastened to the head or member, and it will be noted that the stud shaft carries a crank arm, 20, whereby the jet head, may be rotated or turned over. The arm, 20, contains a set screw, 20', for securing it in either position. A socketed plate, 20'', is provided on the side of the tank, in Fig. 9, to receive the set screw, 20', as shown. The liquid is introduced through the trunnion, 16', and the jet head or member constitutes a part of its own valve. The partition, 14, is enlarged at one end, to accommodate the trunnion which projects within the member. The trunnion is hollow and contains the liquid admission pipe, 21, the joint between the parts being closed by a suitable stuffing box as shown. The pipe, 21, is non-rotary; it being fixed to the supply pipe, 22. The pipe, 21, is provided with a valve opening, 21', in its top near its inner end, and the partition, 14, contains two valve openings, 14', one on each side to register therewith. Thus the enlargement of the partition, 14, and the pipe, 21, constitute a two-way valve, the liquid being always shut off from the lower compartment or chamber while the upper compartment is supplied directly through such open valve. It will now be seen that partial rotation of the head or member by means of the crank arm, 20, first shuts off the flow of liquid to the then upper compartment of the jet member and then, by completely inverting the member, admits the fluid to the other compartment, as required for washing bottles of another size.

It will be noted that the jet member A, is arranged below the level of the other members. This is made necessary by the use of the special nozzles on said member, A, presently to be described. It will also be noted that the trunnions of the member, A, are centrally disposed with relation thereto, whereas in the case of the other members, the trunnions are arranged eccentrically. This last is made necessary by the fact that pint bottle-cases are of greater width than quart bottle-cases, and a row of pint bottle-cases or boxes is of greater length than a row of quart bottle cases. Because of this difference it is necessary to shift the jet heads, B, C and D, so that the different perforated sides thereof shall correspond to the positions or stations of the different sized bottle-cases. This shifting of the heads is accomplished by mounting them eccentrically, as will be clearly seen upon comparison of Figs. 3 and 4. The narrower quart bottle cases require that the jet heads shall be closed or shifted toward the main head or member, A. This is done by turning them toward the member A, and then by simply inverting the members they are relatively separated (see Fig. 3), as required for use with the wider bottle-cases.

In putting my machine into use I prefer that the flow of liquid from the jet openings in the members, B, C and D, shall be constant. The supply pipes, 22, of these members are therefore connected directly to respective pumps. In contra-distinction, the flow of liquid from the head or member, A, is required to be intermittent. This is also true of the member, E. I therefore equip the members, A and E, with controlling valves, the arrangement being such that the over-sprayer, E, operates only when the main sprayer, A, is shut off, as hereinafter described.

The jet head or member, A, upon which I rely for the principal washing or cleansing effect, is in lieu of simple jets, equipped with special bottle washing nozzles, or as they may be otherwise described, shot circulating nozzles. These nozzles, as shown, take the form of cups, partially filled with shot, which latter is driven upward into the inverted bottles and rapidly circulated therein, to effectually cleanse the inside thereof. There are as many of these nozzles as bottles in the corresponding group. The cup portion, 23, of each nozzle has its stem, 23', screwed into the plate, 15, of the jet head, A. The stem contains a central jet opening, 24. The sides of the cup contain a large number of perforations or slots, 25, which allow the free escape of the liquid therefrom. Within the cup are several radial wings, 26, provided with shoulders, 26', to receive the neck of a bottle as shown in Figs. 10 and 11. These wings also support a central shot collecting and guiding tube, or nozzle proper, 27, the flared lower end of which is provided with slots fitting the lower shouldered portions, 26'', of the wings, 26. It will be noted that an annular opening, 28, is left between the lower end of the tube, 27, and the conical bottom of the cup, through which the shot return to the cavity beneath the central tube. The shot are preferably made of aluminum, used because of the lightness of that metal and its non-corrosive quality. The nozzle cup is partially filled with the shot. In operation, as hereinafter more fully explained, the bottle to be washed is first placed in the top of the cup. The liquid is then admitted to the nozzle and the strong stream of liquid which passes upward through the tube, 27, carries with it the shot, driving them forcibly against the inner surface of the bottle. The liquid and the shot fall at the sides of the bottle and return to the cup through the space between the bottle neck and the tube, 27. The liquid escapes through the perforations in the cup and the shot roll to the bottom of the cup, where they are again caught and thrown upward by the stream of liquid. The play of washing fluid within the bottle aided by the rapidly circulated shot effectually cleanses the inside of the bottle, and when this operation has been performed it only remains to rinse the bottles.

As shown the member, A, with its plurality of nozzles or shot cups is preferably stationary and the lowering of successive groups of bottles into washing position upon the nozzles is accomplished by means of the treadle actuated elevator hereinbefore described.

It is obvious that it would be impracticable to allow the jets of water to play continuously from the member, A, as such operation would soon result in the loss of the shot from the cups. When, as in some cases, the shot are removed from the cups, the jets or streams of liquid may be permitted to run continuously, but in the preferred and best use of the machine, the shot are required and it is necessary to shut off the flow of liquid before the bottles are raised out of the cups and until the next group of bottles have been lowered thereupon. To this end I interpose a valve between the washing fluid pump and the inlet pipe or tube of the member, A. Incidentally the same valve structure is made to control the flow of liquid to the overspray member, E. The valve structure referred to is best shown in Figs. 1, 3, 12 and 13, wherein it will be seen to comprise a cylindrical valve casing, 29, containing an internal duct, 30, and valves proper, 31 and 32. The pump connection, 33, is made at the side of the casing. The supply pipe, 22, belonging to the initial washing member, B, is for convenience connected to the casing, 29, the passage therethrough being constantly opened. From the top port, 34, of the casing 29, a pipe, 35, leads to the member, E. The duct, 30, is connected with the member, A. The valves 31 and 32, are joined together and are arranged to close the ports 30 and 34 alternately. 36 represents the valve stem, which extends through a suitable stuffing box. Upon the end of the stem are two dogs or arms, 37 and 38, arranged for operation by a lug or dog, 39, on the rod, 6ª. The construction is such that when said rod and the push bar, 6, are drawn back preparatory to placing another box in the receiving end of the machine, the lug, 39, strikes the arm, 37, and by turning the stem 36, opens the valve, 31, belonging to member, A, and closes the valve, 32, belonging to member, E. As the boxes are pushed forward, the lug, 39, releases the arm, 37, and strikes the arm, 38, thereby closing the valve, 31, and shutting off the flow through member, A. The arm, 38, is so formed that the lug, 39, passes over the same, the stroke of the lug being greater than the distance between the two arms, 37 and 38. On return of the rod, 6ª, the lug, 39, passes over arm, 38, and strikes the arms, 37, to again open the valve, 31, the elevator having previously been lowered to drop the bottles upon the shot cups of member, A.

To prevent the accidental lifting of the bottles from the shot cup or failure to lower the same upon the shot cups before the rod, 6ª, is drawn back to open the valve, 31, I provide the elevator frame and the rod, 6ª, with interfering lugs, 40 and 41. The lug, 40, on the elevator extends through a slot in the side of the tank, and the relations of the lugs 40 and 41, are such that neither the final backward movement of the rod, A, nor its initial forward movement can be performed, except when the elevator is depressed. The rod, 6ª, must be thrust forward and thereby close the valve, 31, before the lug, 41, will free the elevator. In similar manner the elevator must be lowered or depressed before the rod, 6ª, can be drawn back far enough to cause the lug, 39, to strike the dog or arm, 37, and open the valve belonging to the shot cup member. In this connection it should be understood that the lost motion between the push bar, 6, and the first box in the machine is slightly less than the lap of the lug, 41, on the lug, 40, and slightly more than the distance between the lug, 39, and the valve arm, 38. Consequently the unseating of the valve, 32, and the seating of the shot cup valve, 31, is assured, and must take place before the treadle 9, can be depressed to raise the elevator. By this simple means I effectually prevent the accidental discharge and loss of the shot from the cups or nozzles of member, A.

For sake of clearness the drawings show both sides of the jet head, A, equipped with shot cups, but in practice it is usual to remove the cups from the member, A, before inverting it, this being done to avoid loss of the shot. Therefore, in preparing the machine for use, the operator first adjusts the members, A, B, C and D according to the kind of bottles that are to be washed and then places the proper cups upon the member, A. The operator then places a case of bottles upon the elevator and lowers them upon the shot cups or nozzles; at the same time he should place another case over the member, B. Next, the pumps are started into action, to eject sprays or jets from the several members, A, B, C and D. It will be understood that at this time the operator is compelled to draw back the lever, 7, in order to open the shot cup valve. During the time that the shot are playing within the bottles upon the washer nozzles, the operator places another bottle case between the push bar, 6, and the case that stands above the member, B. To shift the cases, the operator first thrusts forward on the lever, 7, thereby shifting the bar, 6ª, and closing the shot cup valve. This operation frees the elevator, and the operator stepping upon the treadle raises the case of washed bottles into line with the other cases, so that continued pressure on the lever, 7, replaces that box or case with the one which previously stood over the member, B. The elevator is then lowered and the lever, 7, drawn back to open the washing fluid valve. It will be noted that the case, which leaves the elevator does not immediately pass to the rinsing head, C, but stands for a moment above the washing fluid compartment, in order that the bottles may drain thoroughly, before being rinsed. The progress of the bottle cases proceeds step by step in this manner, each case of bottles being first subjected to the action of the jets from the members B and E, then scoured and then initially and finally rinsed. Arriving at the rear end of the machine, the box or case is moved upon the tilting frame, 5³, and is discharged therefrom, by the final portion of the forward stroke of the main operating lever, 7.

As various modifications of my invention will readily suggest themselves to one skilled in the art, I do not confine the invention to the specific constructions, herein shown and described.

Having thus described my invention, I claim as new and desire to secure by Letters Patent:

1. A machine for washing cased bottles, comprising a suitable tank, in combination with a plurality of independent jet heads upon different horizontal planes, each containing a plurality of jet openings corresponding in number and position to the bottles in a bottle case, a support above said heads whereon inverted bottle cases are movable, means for moving bottle cases thereon, means for raising and lowering the bottle cases in relation to certain of said heads and means for controlling the flow of liquid in accordance with the movements of said cases, substantially as described.

2. A machine for washing cased bottles, comprising a suitable tank, in combination with a plurality of independent jet heads upon different horizontal planes, each containing a plurality of jet openings corresponding in number and position to the bottles in a bottle case, a support above said heads whereon inverted bottle cases are movable, means for raising and lowering the bottle cases in relation to certain of said heads and a step by step bottle case moving mechanism, substantially as described.

3. A machine for washing cased bottles, comprising a suitable trough, in combination with a bottle case support or track, a plurality of jet heads arranged in said trough and upon different horizontal planes, means for engaging each case of bottles with the lowermost of said heads, during its movement along said track and means for shutting off the flow of liquid through said head when bottles are engaged therewith, substantially as described.

4. A machine for washing cased bottles, comprising a suitable trough, in combination with a bottle case track, a plurality of jet heads or members within the trough and upon different horizontal planes, means for engaging each case of bottles with the lowermost of said heads during movement upon said track, a step by step mechanism for advancing the cases on said track and means actuated thereby to prevent the flow of liquid from said head, except when engaged with bottles, substantially as described.

5. A machine for washing cased bottles, comprising a suitable tank, in combination with a support whereon inverted bottle cases are movable and a plurality of invertible jet heads arranged beneath said support, each said head being provided with two sets of jet openings corresponding in number and position to the bottles in different bottle cases, substantially as described.

6. A machine for washing cased bottles, comprising a suitable tank, in combination with a support whereon inverted bottle cases are movable and a plurality of independent invertible jet heads, substantially as described.

7. A machine for washing cased bottles, comprising a suitable tank, in combination with a support whereon inverted bottle cases are movable and a plurality of revolubly mounted invertible jet heads, provided beneath said support, substantially as described.

8. A machine for washing cased bottles, a suitable tank, in combination with a support for inverted bottle cases, a revolubly mounted invertible plural jet head in said tank, and a like jet head eccentrically mounted in said tank, as and for the purpose specified.

9. A machine for washing cased bottles, comprising an elongated tank or trough, in combination with a plurality of jet heads arranged in said trough, each said head containing two sets of jet openings respectively corresponding, in number and position, to the bottles in bottle cases of different sizes and a support above said heads, whereon inverted bottle cases are movable to successive positions over said heads, substantially as described.

10. In a machine for washing cased bottles, a jet head or member having on opposite sides two sets or groups of jet openings differing as to the number of openings and corresponding to the bottles in the bottle cases wherewith the respective sets are used, substantially as described.

11. A machine for washing cased bottles, comprising a tank, in combination with a bottle case support, a plurality of jet heads or members arranged in the tank, a liquid supply connection for each and each said head comprising a box-like structure rotatively mounted within the tank, containing two compartments and provided with different sets of jet openings in its sides, substantially as described.

12. A machine for washing cased bottles, comprising a tank, in combination with a bottle case support, a plurality of jet heads or members arranged in the tank, a liquid supply connection for each, each said head comprising a box-like structure rotatively mounted within the tank, containing two compartments and provided with different sets of jet openings in its sides and said head and supply connections constituting valves as described.

13. A machine for washing cased bottles, comprising an elongated tank, in combination with a bottle case support, a plurality of jet heads arranged within the tank, each said head containing two compartments and provided with differing sets of jet openings and means for securing said heads with either side presented toward said support, substantially as described.

14. A machine for washing cased bottles, comprising an elongated tank, in combination with a bottle case support, a plurality of jet heads arranged within the tank, each said head containing two compartments and provided with differing sets of jet openings, means for securing said heads with either side presented toward said support and means interposed in said track for engaging each case of bottles with one of said heads, substantially as described.

15. A machine for washing cased bottles, comprising an elongated tank, in combination with a bottle case support, a plurality of jet heads arranged within the tank, each said head containing two compartments and provided with differing sets of jet openings, means for securing said heads with either side presented toward said support, means interposed in said support for engaging each case of bottles with one of said heads and mechanism for advancing cases on said support, substantially as described.

16. A machine for washing cased bottles, comprising an elongated tank, in combination with a bottle case support, a plurality of jet heads arranged within the tank, each said head containing two compartments and provided with differing sets of jet openings, means for securing said heads with either side presented toward said support, means interposed in said support for engaging each case of bottles with one of said heads, mechanism for advancing cases on said support and a valve intermittently operated by the last mentioned means and controlling the supply of liquid to said heads, wherewith bottles are engaged, substantially as described.

17. A machine for washing cased bottles, comprising an elongated tank provided with a bottle case support, in combination with a plurality of jet heads arranged in said tank beneath said support and suitably supplied with liquid, each said head comprising a double compartment box-like member having differing sets of perforations in opposite sides, means for securing said heads, either side up, suitable valves provided in said heads and preventing the flow of liquid through the lower compartments therein, substantially as described.

18. In a machine for washing cased bottles, a tank provided with a bottle case support, in combination with a plurality of jet heads revolubly mounted in said tank, each said head comprising a box like structure containing two compartments and having differing sets of openings in opposite sides and means in connection with each head for supplying liquid only to the uppermost compartment therein, substantially as described.

19. A machine for washing cased bottles, comprising a support adapted to receive a plurality of inverted bottle cases, in combination with a plurality of multiple jet members arranged beneath said support, one of said members provided with shot circulating nozzles and means for engaging said nozzles with the bottles in each said case, substantially as described.

20. In a machine for washing cased bottles, a support adapted to receive a plurality of inverted bottle cases, a plurality of perforated cups arranged beneath said support and corresponding in number and position to the bottles in a bottle case, means interposed in said support for engaging bottles with said cups and shot circulating means within said cups, substantially as described.

21. In a machine for washing cased bottles a support adapted to receive a plurality of inverted bottle cases, a plurality of perforated cups partially filled with shot and arranged beneath said support, corresponding in number and position to the bottles in a case, each said cup provided with a liquid jet opening, and a shot guide suspended beneath each cup, substantially as described.

22. In a machine for washing cased bottles, a track adapted to support a plurality of bottle cases, in combination with a plurality of box-like jet heads arranged beneath said track, and each containing two liquid compartments and provided with differing sets of jet openings, one of said heads mounted for rotation upon its central axis, and the other upon an eccentric axis, one of said mounted heads having a plurality of shot circulating cups and means for engaging each case of bottles with said cups, substantially as described.

23. In a machine for washing cased bottles, a track adapted to support a plurality of bottle cases, in combination with a plurality of box-like jet heads arranged beneath said track, and each containing two liquid compartments and provided with differing sets of jet openings, one of said heads mounted for rotation upon its central axis, and the other upon an eccentric axis, one of said mounted heads having a plurality of shot circulating cups, means for engaging each case of bottles with said cups and means for shutting off the flow of liquid through said cups, except when engaged with bottles, substantially as described.

24. In a machine for washing cased bottles, a suitable tank, in combination with a bottle case track, a plurality of plural jet heads, one of which is provided with intermittently operable nozzles and vertically operable means interposed in said track for lowering each case of bottles upon said nozzles, substantially as described.

25. A machine for washing cased bottles, comprising a tank, in combination with a plurality of jet heads arranged in said tank upon different horizontal planes and each provided with jet openings corresponding in number and position to the bottles in a bottle case, a track arranged above said heads to support a plurality of bottle cases in inverted position, means for raising and lowering said bottle cases in relation to the lowermost of said heads, means for supplying liquid to said heads, and means whereby certain thereof are supplied with liquid intermittently, substantially as described.

26. In a machine for washing cased bottles, a plurality of jet heads, each provided with jet openings, corresponding in number and position to the bottles in a bottle case, means whereby cases containing bottles are moved into proper relation to said heads successively, means whereby certain of said heads are caused to operate continuously, means whereby one of said heads is caused to operate intermittently, and a plurality of shot circulating nozzles upon the latter head, substantially as described.

27. In a machine for washing cased bottles, a plurality of jet heads, each provided with jet openings corresponding in number and position to the bottles in a bottle case, means whereby cases containing bottles are moved into proper relation to said heads successively, means whereby certain of said heads are caused to operate continuously, means whereby one of said heads is caused to operate intermittently, a plurality of shot circulating nozzles upon the latter head, and a case elevator for lowering successive cases upon said nozzles, substantially as described.

28. A machine for washing cased bottles, comprising a suitable tank, in combination with a plurality of independent jet heads, each containing a plurality of jet openings, a support above said heads whereon inverted bottle cases are movable to successive positions thereover, and said support having a section which is vertically movable for raising and lowering bottle cases over one of said heads, substantially as described.

29. A bottle washing machine comprising a track to receive a plurality of bottle cases in inverted position, in combination with a jet head arranged beneath said track, a plurality of shot circulating nozzles thereon, and means for relatively moving said jet head and the bottle case or box above the same, to engage the necks of the bottles with said nozzles, there being also means for supplying liquid to said nozzles when only they are in engagement with the bottles, substantially as described.

30. A cased bottle washing machine comprising a track, and means for moving bottle cases thereon, in combination with an elevator interposed in said track, a plurality of jet heads situated at different points beneath said track, shot circulating nozzles upon the jet head which is associated with said elevator, and a liquid valve operable in time with said elevator and adapted to prevent the discharge of liquid through said nozzles while the bottle cases are being moved, or shifted upon said track, substantially as described.

31. In a machine for washing cased bottles, a track adapted to receive a plurality of bottle cases in inverted position, in combination with a plurality of multiple jet heads arranged beneath said track, a plurality of shot circulating nozzles, provided upon one of said heads, a bottle case elevator associated with the latter head, a valve provided in the liquid connection of said head, a case moving lever adapted to operate said valve and interlocking devices upon said elevator, said lever preventing the opening of said valve, except when said elevator is in its lowered position, substantially as described.

32. In a bottle washing machine, a box-like jet head, in combination with a plurality of shot circulating nozzles, comprising cups containing shot guiding tubes and means for engaging said nozzles with the bottles to be washed, substantially as described.

33. In a bottle washing machine, a box-like jet head, in combination with a plurality of shot circulating nozzles, comprising cups containing shot guiding tubes, means for engaging said nozzles with the bottles to be washed and a valved liquid supply pipe communicating with said head, substantially as described.

34. In a bottle washing machine, a jet head containing two compartments and provided with valve openings communicating with respective compartments, and a liquid supply pipe whereon said head is revoluble, said supply pipe containing a valve opening to register with the upper valve opening in said head, substantially as described.

35. In a machine for washing cased bottles, an elongated tank, in combination with a track therein, a plurality of multiple jet heads provided in said tank, means dividing said tank into washing and rinsing fluid compartments, an oversprayer and intermitting valves interposed between said oversprayer and the jet head which is supplied with washing fluid, substantially as described.

36. In a machine for washing cased bottles, an elongated tank containing a case track, in combination with a plurality of jet heads provided in said tank, means in said track for lowering each case upon one of said heads, a valved liquid supply connection for the last mentioned head, a suitably actuated push bar for moving cases on said track, the movement of said bar exceeding the length of a case, and suitable connection between said push bar and said valved liquid supply, whereby the lost motion of said bar will operate said valved liquid supply, substantially as described.

37. A machine for washing cased bottles comprising a track to receive a plurality of bottle cases, in combination with a tilting frame, provided at the end of said track or support, means for operating said frame to discharge successive cases and suitable liquid spraying means beneath said support, substantially as described.

38. A machine for washing cased bottles, comprising a bottle case track, in combination with a plurality of jet heads arranged beneath the same, means for advancing bottle cases on said track and means at the end of said track for tilting and inverting successive bottle cases, substantially as described.

39. A bottle washing machine, comprising a track, and means for moving bottle cases thereon, in combination with means beneath said track for directing jets of water into the bottles held in said cases and means at the end of said track for inverting and discharging the bottle cases after the bottles are washed, substantially as described.

40. A machine for washing cased bottles, comprising a track, in combination with a tilting frame provided at the end thereof, a lever for advancing bottle cases on said track, means connected therewith for operating said tilting frame and a plurality of plural jet members provided beneath said track, substantially as described.

41. A machine for washing cased bottles, comprising a bottle case support, in combination with a plurality of jet heads arranged in different horizontal planes beneath said support, means for imparting step by step motion to the bottle cases on said support, means for engaging each case of bottles with the lowermost of said jet heads, and means for controlling the flow of liquid from said jet heads in accordance with the movement of said cases, substantially as described.

42. A bottle washing machine comprising a track and means for moving bottle cases thereon, in combination with means beneath said track for directing charges of water into the bottles held in said case, and means for tilting the end of said track for discharging the bottle cases after the bottles are washed, substantially as described.

43. A bottle washing machine comprising a sectional track, and means for moving bottle cases thereon, in combination with means beneath said track for directing jets of water into the bottles held in said case, and means for tilting the end section of said track to discharge the bottle cases after the bottles are washed, substantially as described.

44. A bottle washing machine, comprising a track, and means for moving bottle cases thereon, in combination with means beneath said track for directing jets of water into the bottles held in said case, means for tilting the end of said tracks to discharge the bottle cases after the bottles are washed, and means for inverting said bottle cases; substantially as described.

45. In a machine for washing cased bottles, an elongated tank containing a case track arranged in sections, in combination with a plurality of jet heads provided in said tank, means for lowering and raising one section of the track to permit the necks of bottles supported thereby to engage the jets of one of said heads, a valved liquid supply connection for the last mentioned head, and means for moving the case along said track, substantially as described.

46. In a machine for washing cased bottles, an elongated tank containing a case track arranged in sections therein, means for raising and lowering one of said track sections, and means for tilting another of said sections, in combination with a plurality of jet heads provided in said tank, a liquid supply connection for each of said heads, means for moving cases on said track, and means whereby certain of said jet heads are caused to operate continuously and others intermittently, substantially as described.

In testimony whereof, I have hereunto set my hand, this 23 day of July, 1906, in the presence of two subscribing witnesses.

THEODORE L. VALERIUS.

Witnesses:
SANFORD P. STARKS,
IRVING R. HIPPENMEYER.